(12) United States Patent
Gong et al.

(10) Patent No.: US 7,440,615 B2
(45) Date of Patent: Oct. 21, 2008

(54) VIDEO FOREGROUND SEGMENTATION METHOD

(75) Inventors: Yihong Gong, Saratoga, CA (US); Mei Han, Cupertino, CA (US); Wei Xu, Princeton, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 82 days.

(21) Appl. No.: 11/553,043

(22) Filed: Oct. 26, 2006

(65) Prior Publication Data

US 2007/0116356 A1   May 24, 2007

Related U.S. Application Data

(60) Provisional application No. 60/730,730, filed on Oct. 27, 2005.

(51) Int. Cl.
   *G06K 9/34* (2006.01)
(52) U.S. Cl. ...................................... 382/173
(58) Field of Classification Search ................. 382/173
   See application file for complete search history.

(56) References Cited

U.S. PATENT DOCUMENTS

| | | | |
|---|---|---|---|
| 6,480,615 B1 * | 11/2002 | Sun et al. | 382/103 |
| 6,738,154 B1 * | 5/2004 | Venable | 358/1.15 |
| 6,901,169 B2 * | 5/2005 | Bottou et al. | 382/224 |
| 7,085,401 B2 * | 8/2006 | Averbuch et al. | 382/103 |
| 7,158,680 B2 * | 1/2007 | Pace | 382/232 |

OTHER PUBLICATIONS

Duncan, J.H.: Tsai-Chia Chou, "Temporal Edges: The Detection Of Motion And The Computation Of Optical Flow," Computer Vision., Second International Conference on , vol., No., pp. 374-382, Dec. 5-8, 1988.*

Ando, S., "Image field categorization and edge/corner detection from gradient covariance," Pattern Analysis and Machine Intelligence. IEEE Transactions on , vol. 22, No. 2, pp. 179-190, Feb. 2000.*

* cited by examiner

*Primary Examiner*—Bhavesh Mehta
*Assistant Examiner*—Hadi Akhavannik
(74) *Attorney, Agent, or Firm*—Brosemer, Kolefas & Associates LLC

(57) ABSTRACT

A fully automatic, computationally efficient segmentation method of video employing sequential clustering of sparse image features. Both edge and corner features of a video scene are employed to capture an outline of foreground objects and the feature clustering is built on motion models which work on any type of object and moving/static camera in which two motion layers are assumed due to camera and/or foreground and the depth difference between the foreground and background. Sequential linear regression is applied to the sequences and the instantaneous replacements of image features in order to compute affine motion parameters for foreground and background layers and consider temporal smoothness simultaneously. The Foreground layer is then extracted based upon sparse feature clustering which is time efficient and refined incrementally using Kalman filtering.

4 Claims, 6 Drawing Sheets

(a)

(b)

(a)

(b)

(c)

(d)

VIDEO FOREGROUND SEGMENTATION METHOD

CROSS REFERENCE TO RELATED APPLICATIONS

This application claims the benefit of U.S. Provisional Patent Application No. 60/730,730 filed Oct. 27, 2005 the entire contents and file wrapper of which are incorporated by reference as if set forth at length herein.

FIELD OF THE INVENTION

This invention relates generally to the field of video processing and in particular relates to a method for segmenting videos into foreground and background layers using motion-based sequential feature clustering.

BACKGROUND OF THE INVENTION

The ability to segment or separate foreground objects from background objects in video images is useful to a number of applications including video compression, human-computer interaction, and object tracking—to name a few. In order to generate such segmentation—in both a reliable and visually pleasing manner—the fusion of both spatial and temporal information is required. As can be appreciated, this fusion requires that large amounts of information be processed thereby imposing a heavy computational cost and/or requiring substantial manual interaction. This heavy computation cost unfortunately limits its applicability.

Video matting is a classic inverse problem in computer vision research that involves the extraction of foreground objects and alpha mattes which describe their opacity from image sequences. Chuang et al proposed a video matting method based upon Bayesian matting performed on each individual frame. (See, e.g., Y. Y. Chuang, A. Agarwala, B. Curless, D. H. Salesin and R. Szeliski, "Video Matting of Complex Scenes", ACM SIGGRAPH 2002, pp. II:243-248, 2002, and Y. Y. Chuang, B. Curless, D. H. Salesin, and R Szeliski, "A Bayesian Approach To Digital Matting", CVPR01, pp. II:264-271, 2001). Such methods require accurate user-labeled "trimaps" that segment each image into foreground, background, and unknown regions. Computationally, it is quite burdensome to periodically provide such trimap labels for long video sequences.

Apostolof and Fitzgibbon presented a matting approach for natural scenes assuming a camera capturing the scene is static and the background is known. (See., e.g., N. Apostoloff and A. W. Fitzgibbon, "Bayesian Video Matting Using Learnt Image Priors", CVPR04, pp. I:407-414, 2004).

Li, et. al. used a 3D graph cut based segmentation followed by a tracking-based local refinement to obtain a binary segmentation of video objects, then adopt coherent matting as a prior to produce the alpha matte of the object. (See., e.g., J. Shum, J. Sun, S. Yamazaki, Y. Li and C. Tang, "Pop-Up Light Field: An Interactive Image-Based Modeling and Rendering System", ACM Transaction of Graphics, 23(2):143-162, 2004). This method too suffers from high computational cost and possible need for user input to fine tune the results.

Motion based segmentation methods perform motion estimation and cluster pixels or color segments into regions of coherent motion. (See., e.g., R. Vidal and R. Hartley, "Motion Segmentation With Missing Data Using Powerfactorization and GPCA", CVPR04, pp. II-310-316, 2004). Layered approaches represent multiple objects in a scene with a collection of layers (See, e.g., J. Xiao and M. Shah, "Motion Layer Extraction In the Presence Of Occlusion Using Graph Cuts", CVPR04, pp. II:972-79, 2004; N. Jojic and B. J. Frey, "Learning Flexible Sprites in Video Layers", CVPR01, pp. I:255-262, 2001; J. Y. A. Wang and E. H. Adelson, "Representing Moving Images With Layers", IP, 3(5):625-638, September, 1994). Wang and Ji described a dynamic conditional random field model to combine both intensity and motion cues to achieve segmentation. (See., e.g., Y. Wang and Q. Ji, "A Dynamic Conditional Random Field Model For Object Segmentation In Image Sequences", CVPR05, pp. I:264-270, 2005). Finally, Ke and Kanade described a factorization method to perform rigid layer segmentation in a subspace because all of the layers share the same camera motion. (See., e.g., Q. Ke and T. Kanade, "A Subspace Approach To Layer Extraction", CVPR01, pp. I:255-262, 2001). Unfortunately, many of these methods assume that objects are rigid and/or the camera is not moving.

SUMMARY OF THE INVENTION

An advance is made in the art in accordance with the principles of the present invention directed to a fully automatic, computationally efficient segmentation method employing sequential clustering of sparse image features.

Advantageously both edge and corner features of a video scene are employed to capture the outline of foreground objects. The feature clustering is built on motion models which work on any type of object and moving/static cameras.

According to an embodiment of the present invention, two motion layers are assumed due to camera and/or foreground and the depth difference between the foreground and background. Sequential linear regression is applied to the sequences and the instantaneous replacements of image features in order to compute affine motion parameters for foreground and background layers and consider temporal smoothness simultaneously. The Foreground layer is then extracted based upon sparse feature clustering which is time efficient and refined incrementally using Kalman filtering.

DESCRIPTION OF THE DRAWING

Further features and aspects of the present invention may be understood with reference to the accompanying drawing in which:

FIG. 1 shows sparse feature extraction for: FIG. 1(A) an original image; and FIG. 1(B) detected features including both corner and edge features;

FIG. 2 shows feature clustering of: FIG. 2(A) results of sequential feature clustering, and FIG. 2(B) clustering results without considering temporal constraints;

FIG. 3 shows foreground extraction of: FIG. 3(A) foreground mask after an x-scan; FIG. 3(B) foreground mask after two-way scan; FIG. 3(C) final foreground mask, where lighter pixels denote the foreground mask; and FIG. 3(D) extracted foreground layer;

FIG. 4 shows the effects of Kalman filtering on: FIG. 4(A) original video frames; FIG. 4(B) foreground layers without temporal refinement, and FIG. 4(C) foreground layers after Kalman filtering;

FIG. 5 shows video sequences of: FIG. 5(A) original video frames; and FIG. 5(B) foreground layers;

FIG. 6 shows video sequences having a human subject of: FIG. 6(A) original video frames; FIG. 6(B) foreground layers; and FIG. 6(C) hallucinated background.

DETAILED DESCRIPTION

The following merely illustrates the principles of the invention. It will thus be appreciated that those skilled in the art will be able to devise various arrangements which, although not explicitly described or shown herein, embody the principles of the invention and are included within its spirit and scope.

Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

Sequential Feature Clustering

According the present invention, foreground segmentation is determined using sparse features thereby improving the computational cost. For method that operates according to the present invention, we assume that there are only two layers, namely a foreground layer and a background layer. In addition, sparse features are clustered into two classes based upon their motion information.

Operationally, we compute optical flows of the sparse features between consecutive frames and then apply linear regression techniques to compute affine parameters of the two layers. To take advantage of the temporal information, we perform sequential linear regression on sequences of optical flow values to achieve more reliable and temporally smoother clustering results.

Sparse Features

Both corner and edge features are extracted to cover those areas which do not have good textures, but have clear outlines—such as human faces. As may be appreciated by those skilled in the art, edge features provide information about the outline of an object but their optical flows have the foreshortening problem which we have deal with in the linear regression computation.

Figure 1:
Figure 1:

FIG. 1 shows sparse feature extraction for FIG. 1(A) an original image and FIG. 1(B) detected features including both corner and edge features. Advantageously, according to the principles of the present invention, we use canny edge detection to extract features from the image as shown in FIG. 1(B). A covariance matrix is computed for each individual feature to determine if the feature is an edge or a corner feature:

$$\text{feature} \begin{cases} \text{edge,} & \text{if } eig1 > \alpha eig2 \text{ and } eig2 < \beta \\ \text{corner,} & \text{otherwise} \end{cases} \quad [1]$$

$eig1$ and $eig2$ are the eigenvalues of the covariance matrix, and $\alpha$ and $\beta$ are parameters. Conveniently, Lucas and Kanade have described a method to compute the optical flow values of the features (See, e.g., B. D. Lucas and T. Kanade, "An Iterative Image Registration Technique With An Application To Stereo Vision", IJCAI81, pp. 674-679, 1981.)

For edge features—according to an embodiment of the present invention—we compute its normal direction (dx,dy) from the covariance matrix and project its optical flow to this direction, i.e., we only keep the normal optical flow in affine parameter computation.

Linear Regression

Given a set of features and their optical flow values between two frames: $(\delta x_i, \delta y_i)$, i=1, ..., n where n is the number of features, we apply a linear regression flow technique to compare two sets of affine parameters, and classify the features to each set. An embodiment of our method may be summarized as follows:

1. Randomly cluster features into two sets;
2. Compute the least square solutions of the affine parameters for each set of features, use the normal optical flow for edge features;

$$a_l x_j + b_l y_j + c_l = \delta x_j$$

$$d_l x_j + e_l y_j + f_l = \delta y_j \quad [2]$$

Where $l \in \{1,2\}$ denotes two layers, $j \in \{1, ..., n\}$ and $(x_j, y_j) \in \text{Layer}_l$. Each edge feature only contributes one equation which is the dot product of its normal direction $(dx_j, dy_j)$ and it corresponding two equations.

3. Fit each feature into both affine motion models and compare residuals;
4. Classify each feature to the affine model with smaller residual, if the smaller residual is above a threshold, it is put into a garbage-set and next iteration of computation is skipped;
5. Go back to step 2, above until clustering process converges which means that none of the features would change assigning labels.

Sequential Clustering

Advantageously, and according to the principles of the present invention, we extend the feature clustering by linear regression between two frames to a few frames so that we can take advantage of the temporal consistence and achieve smoother and more reliable results. Since our feature clustering is based upon affine motion models which work better when the camera is moving, and/or the foreground objects and the background objects have independent motion. While this is not always true between two frames, advantageously a few frames (such as 5-7 frames when the video frame rate is 6 frames per second) will usually provide enough motion information to distinguish the foreground and background layers.

We incorporate the temporal information by performing linear regression on a few consecutive frames jointly. Given m consecutive frames, we may solve 2(m−1) affine parameters together where there are a pair of affine parameter to solve between two consecutive frames: $(a_{kl}, b_{kl}, c_{kl}, d_{kl}, e_{kl}, f_{kl})$, k=1, ... m−1 to represent the affine motion between frame k to k+1 and $l \in \{1,2\}$ denotes one of the two layers.

The connection between the sets of parameters is built upon the feature correspondences which can be achieved through optical flow computation. When a new frame k is available, corner/edge features $(x_i, y_i)$, i=1, ..., n are detected first, then the optical flow $(\delta x_i, \delta y_i)$ between frame k and k−1 is computed for each feature. The corresponding feature i is searched over the features detected in frame k−1 to find the closest one to the warped feature point $(x_i + \delta x_i, y_i + \delta y_i)$, and if the distance between the closest one and the warped one is below some threshold, the correspondence is established.

Otherwise, the feature i is labeled as "no match". Connection is built for corresponding features points that share the same layer label.

The initialization label for feature i is copied from the label of its corresponding point in frame k−1. As for features with "no match", the initialization label takes the label of its nearest neighbor in frame k−1.

During the iterations of linear regression for each pair of frames, a joint residual is computed for corresponding features:

$$r_{li} = \sum_{k=1,\ldots,m-1} r_{kli} \quad [3]$$

for feature i. Conversion of $r_{li}$ and $r_{2i}$ would determine which layer feature i belongs. For "no match" points, the clustering is the same as the method between two frames.

Figure 2:
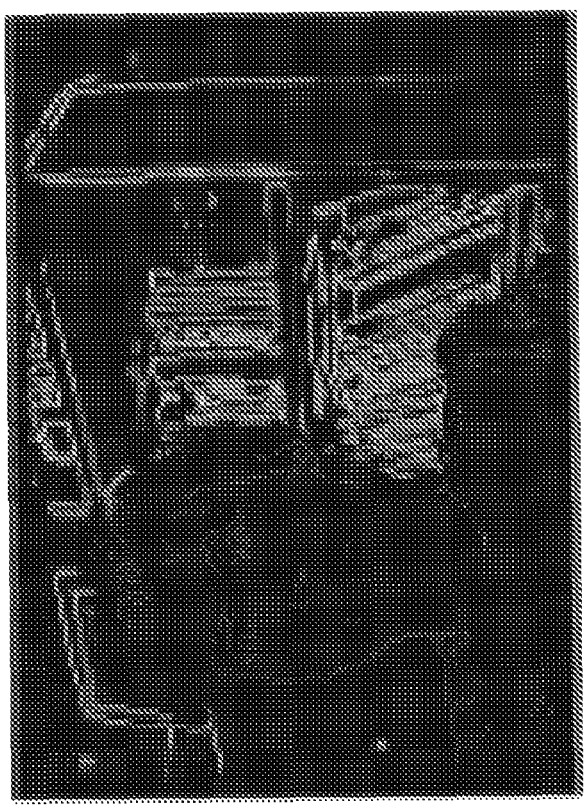
Figure 2:

The joint solution of sequences of linear regression problems naturally takes into account the temporal consistence which makes the clustering results more reliable and smoother. FIG. 2 shows the results of using sequential clustering (m=3) (FIG. 2(A)) and independent clustering (only linear regression between two frames) (FIG. 2(B)).

Foreground Refinement

Based upon the clustering results of sparse features, we first extract the foreground layer by a simple two-way scanning method, and then refine the layer extraction incrementally through Kalman filtering.

Foreground Extraction

Foreground extraction is to get the dense output, i.e., layer labeling of each pixel given the sparse feature clustering. Accordingly, we first determine which layer is the foreground layer based on the following observations:

1. The foreground layer is closer to the camera, therefore for most cases the affine parameters of the foreground layer have larger values. In a preferred embodiment, we only check the absolute values of the translation parameters $|c_i|+|f_i|$. The larger this value, the greater likelihood that the layer is a foreground layer. However, special cases exist when the camera is following the foreground object where the foreground barely moves. Advantageously, we could either compensate by calculating the camera motion—which is typically time consuming—or we could let other characteristics weigh the determination.

2. Foreground layer is rarely cut into pieces, that is, the foreground layer is one or a few connected areas.

3. Background layer is scattered around the boundaries of the images.

4. If a human exists in the foreground, most likely the foreground has more skin color pixels.

As can be appreciated, we could build the foreground layer extraction upon color segmentation results. For each segment, the features covered by this segment would vote which layer it belongs to. Advantageously, this approach provides smooth foreground outlines but exhibits two main drawbacks. First, there are some segments without enough feature coverage whose label could not be determined. Second, the color segmentation itself is quite computationally intensive.

According to the present invention, we employ a two-way scan method to assign each pixel to one of two layers. This two-way scan includes both x-scan and y-scan whereby x-scan works over each row of the image to determine the cutting point between layers in the x dimension. That is, the method locates the shift point between background layer and foreground layer in order to generate a few foreground line segments or each row of the image. The same process is performed for the y-scan, except the cutting point is determined for layers in the y dimension.

Two scan images are combined in an aggressive way to grow the foreground layer. If a pixel is labeled "foreground" in either the x-scan image or the y-scan image, it is labeled "foreground" in the final result. We then use a flood fill algorithm to generate the dense output with a few rounds of image morphing operations to denoise.

Figure 3:
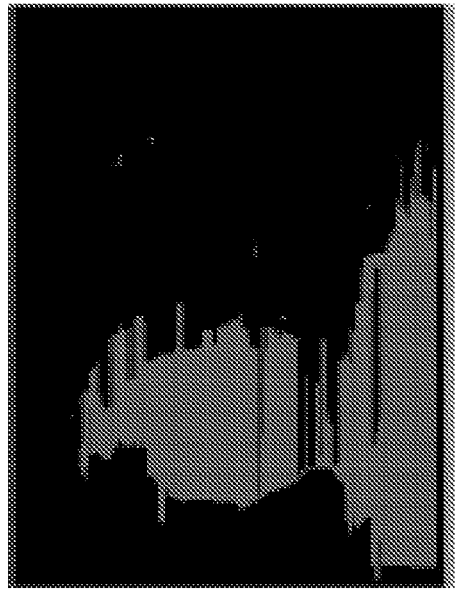
Figure 3:
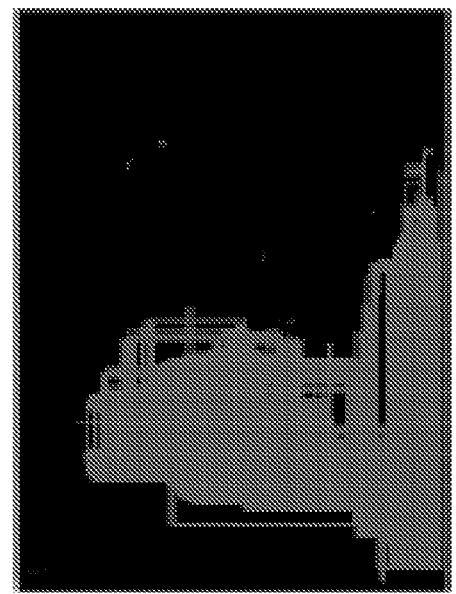
Figure 3:
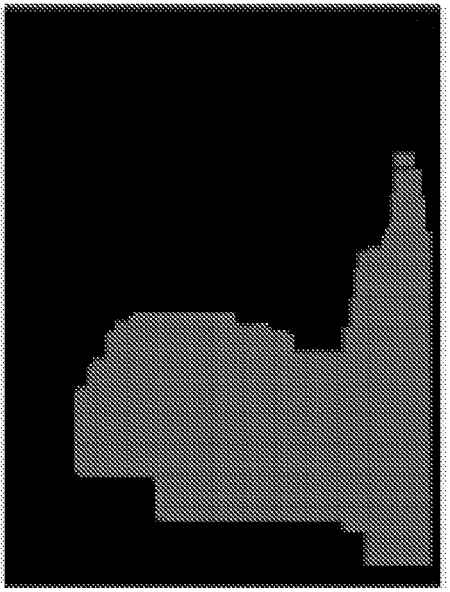
Figure 3:

Turning now to FIG. 3, there it shows the foreground extraction process employing the two-way scan algorithm. More particularly, FIG. 3(A) is the x-scan result. FIG. 3(B) shows the combination of the y-scan result and the x-scan result. FIG. 3(C) shows the final extracted foreground layer wherein the lightened portion denotes the foreground mask. Finally, FIG. 3(D) shows the final output of the foreground object.

Refinement by Kalman Filtering

Figure 4:
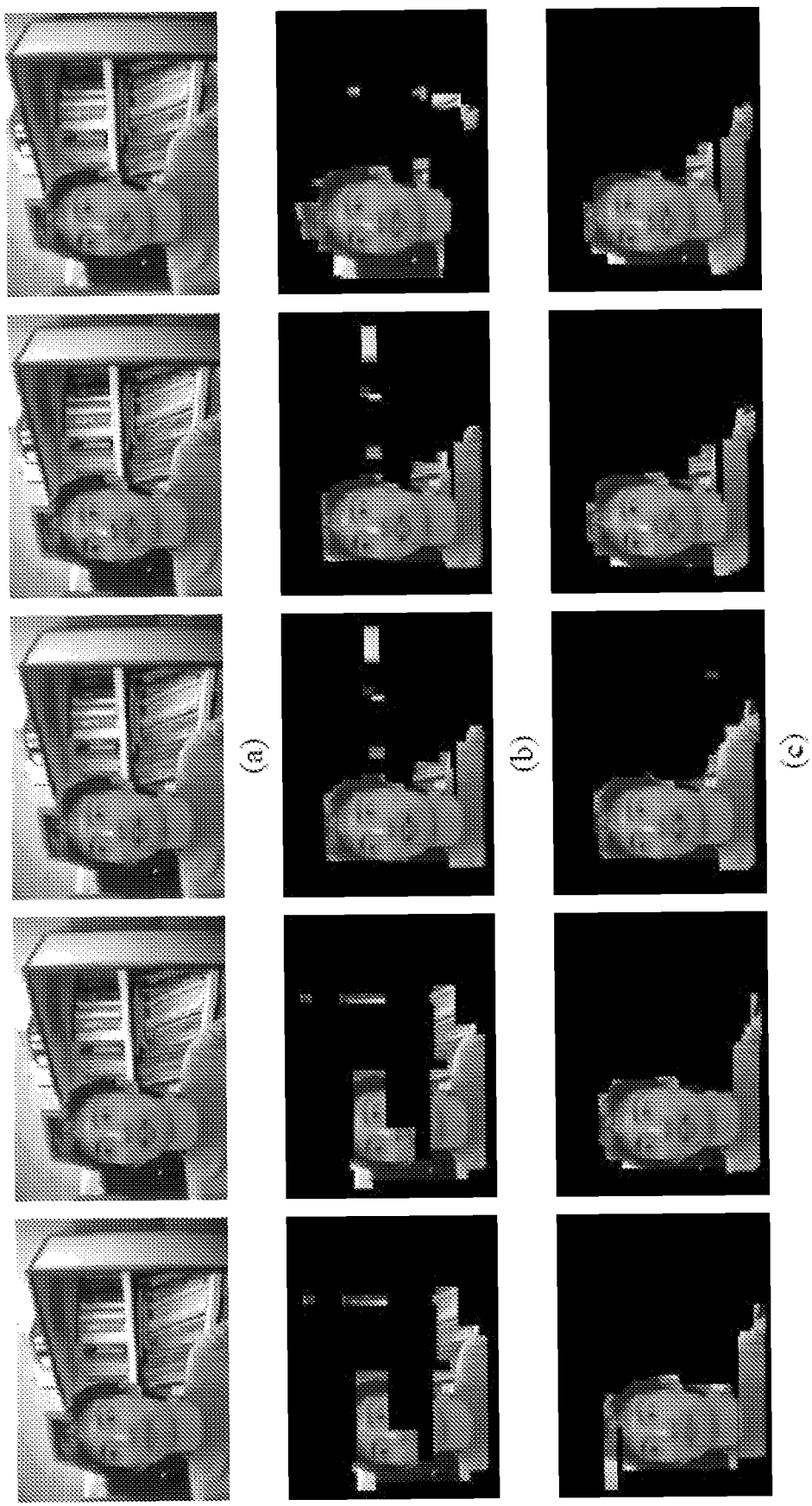

Although we have incorporated temporal information in sequential feature clustering, there still exists some error in feature labeling which could make dense output appear "jumpy" as depicted in FIG. 4(B). This undesirable characteristic is due, in part to the existence of "no match" features, errors in optical flow computation, noises when solving linear regression, and the aggressive approach taken for foreground extraction. Accordingly—and in accordance with an embodiment of the present invention—we apply the Kalman filtering technique to refine the foreground extraction result gradually over time—thereby making the results more visually pleasant. FIG. 4(C) shows the results after performing Kaman filtering over foreground layers in order to make the results appear more visually pleasing.

Experimental Results

An exemplary implementation of a segmentation method according to the present invention was tested and simulated on real videos taken under different lighting conditions and camera motions. In particular, we will show two examples captured by a lightweight, creative webcam. The resolution of the images is 640×480 pixels. The frame rate is 6 frames per second. As can be readily appreciated by those skilled in the art, the quality of webcam images are close to those exhibited by cell phone video cameras. Finally, for the purposes of these tests, we allow the webcam to move while capturing video images and do not know initially whether the foreground or background is static or its composition.

A first sequence was taken of a rigid scene while the camera was moving. The scene is composed of a box of tapes which is positioned closer to the camera as the foreground object, and a flat background. Due to low quality and limited view angle of this webcam, the object was very close to the camera when the video was taken. Therefore, there existed some distortions, as shown in FIG. 5(A), which made feature tracking and motion modeling difficult.

Figure 5:
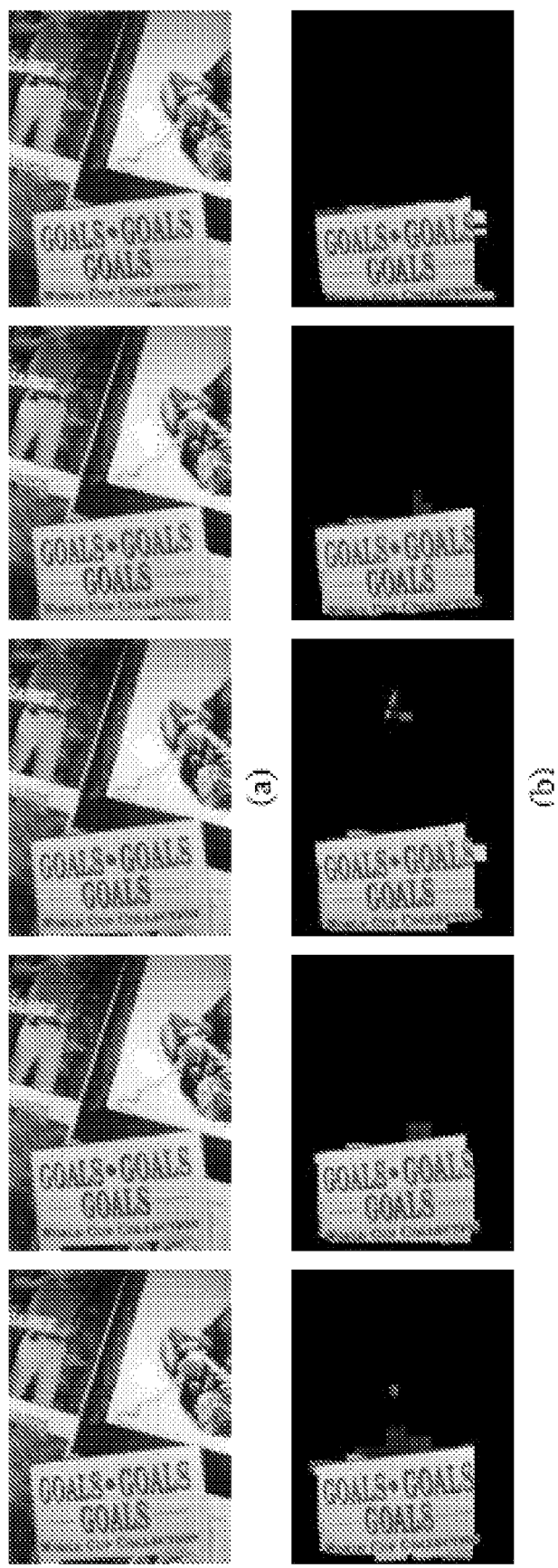

FIG. 5(B) shows the foreground layer extracted by the method of the present invention. Since the method makes use of edge features, there exists some errors at the background edges where the error in optical flow is large. This artifact may be seen in the third frame of the results frames.

Figure 6:
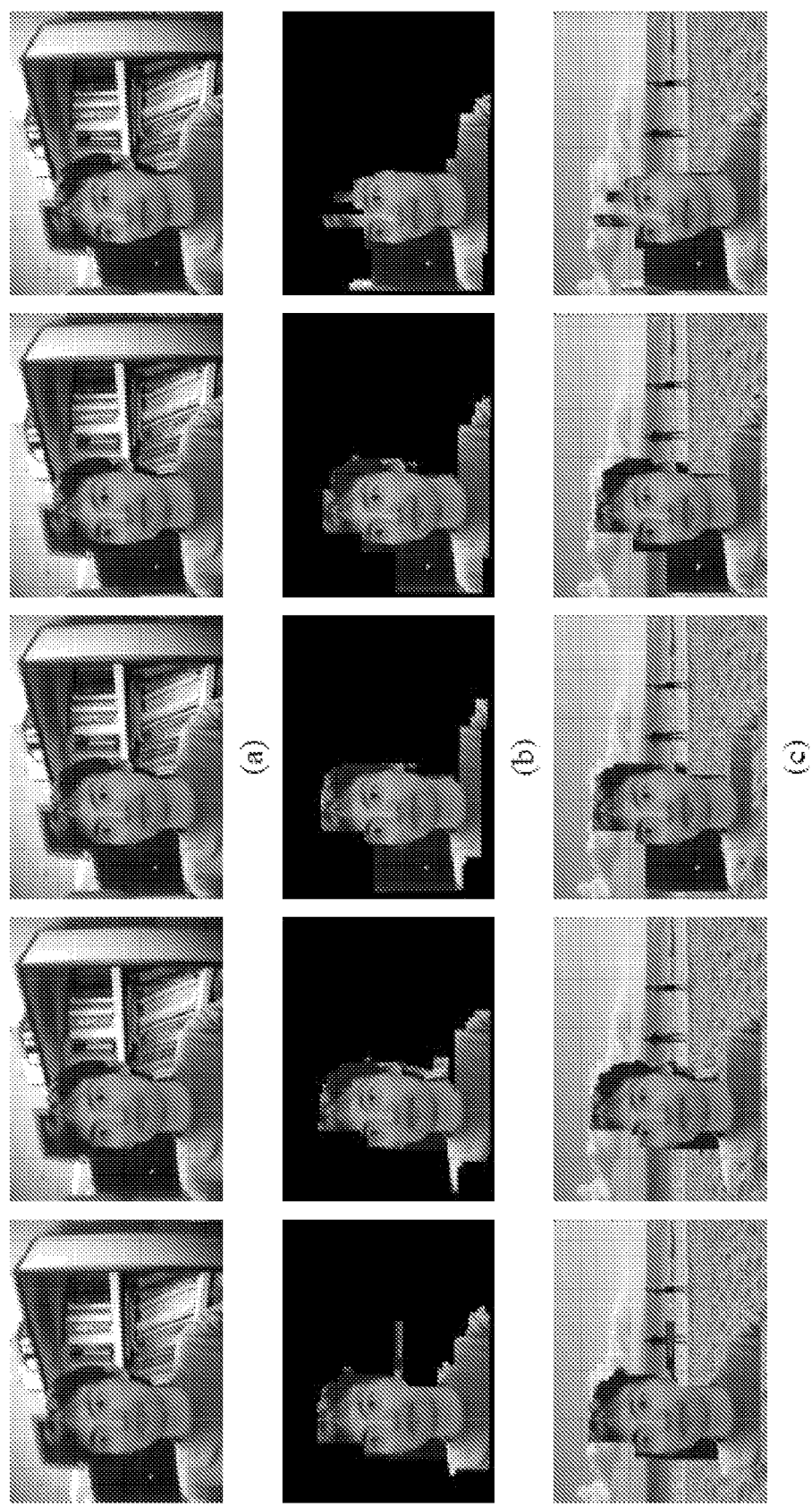

A second sequence was taken of a person moving and talking in front of the camera while holding the camera himself. The camera was shaking randomly with the person's movement. Most of the facial features were undergoing nonrigid motions. In addition, there were blurred areas in the video where feature tracking exhibits large errors. Since the method works on sequential feature clustering and incremental refinement by Kalman filtering, the temporally local blurring could be fixed over time. FIG. 6(B) shows the foreground layers extracted by the method of the present invention. Advantageously—and according to a further aspect of the present invention—the background may be hallucinated to some new scene for fun or privacy—as shown in FIG. 6(C).

As now apparent to those skilled in the art and in accordance with an aspect of the present invention, we have described a segmentation method to extract foreground objects from background objects in a video scene. Advantageously, the method may be applied to Television (TV), telephone images, and video conference images to—for example—hide background information for privacy, or hallucinate a new background for entertainment. Compared with image matting methods which require large amounts of manual (human) input, the method of the present invention is fully automatic.

In sharp contrast with motion layer methods which assume that objects are rigid, the method of the present invention assumes that there are two motion layers due to camera and/or foreground motion and the depth difference between foreground and background. The computation cost of the method of the present invention is modest since it is based upon sequential clustering of sparse image features while prior art methods typically work on pixels or color segments. And in addition to corner features, the present invention uses edge features as well to capture the outline of the foreground objects. The foreground layer is then extracted based on sparse feature clustering which—as we have noted—is quite computationally and time efficient.

Significantly, the method of the present invention takes advantage of the temporal information by applying a sequential linear regression approach to the sequences of the instantaneous replacements of image features in order to compute the affine motion parameters for foreground and background layers. The foreground layers are also refined incrementally using Kalman filtering.

The experimental results on the webcam are promising. And while the present invention has been described with these applications in mind, those skilled in the art will of course recognize that the present invention is not limited to those examples shown and described. Any video composition—particularly those where computation power is limited—is a candidate for the method of the present invention. Accordingly, our invention should be only limited by the scope of the claims attached hereto.

What is claimed is:

1. For a video image including both a foreground layer and a background layer a method of segmenting the foreground layer from the background layer, said method comprising the computer implemented steps of:
    extracting sparse features from a series of image frames thereby producing a sparse feature set for each of the individual images in the series;
    performing a sequential linear regression on the sparse feature sets thereby producing a sequential feature clustering set;
    extracting the foreground layer from the background layer using the sequential feature clustering set;
    refining the extracted layer;
    determining optical flows of the sparse features between consecutive frames;
    determining a set of features including both edge features and corner features;
    computing a covariance matrix for each individual feature to determine if the feature is an edge or a corner feature, wherein a covariance matrix is computed for each individual feature to determine if the feature is an edge or a corner feature;
    computing, for each edge feature, its normal direction (dx, dy) from the covariance matrix; and
    projecting its optical flow to this nominal direction.

2. The method according to claim 1 wherein a set of features and their optical flow values between two frames is defined by: $(\delta x_i, \delta y_i), i=1, \ldots, n$ where n is the number of features, said method further comprising the steps of:
    comparing two sets of affine parameters, and
    classifying features to each set.

3. The method of claim 2 wherein said comparing and classifying steps further comprise the steps of:
    randomly clustering the features into two sets;
    determining least square solutions of the affine parameters for each set of features, and use normal optical flow for edge features;
    fitting each feature into both affine motion models and comparing residuals;
    classifying each feature to the affine model depending upon the residual;
    repeating, the determining, fitting and classifying steps above until the clustering process converge.

4. The method of claim 3 further comprising the step of:
    extending the feature clustering from two frames to several frames.

* * * * *